(12) United States Patent
Takahama et al.

(10) Patent No.: US 7,224,445 B2
(45) Date of Patent: May 29, 2007

(54) VEHICLE EXTERNAL RECOGNITION SYSTEM AND RELATED METHOD

(75) Inventors: Taku Takahama, Yokosuka (JP); Takeshi Kimura, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 275 days.

(21) Appl. No.: 10/826,271

(22) Filed: Apr. 19, 2004

(65) Prior Publication Data

US 2004/0233417 A1    Nov. 25, 2004

(30) Foreign Application Priority Data

May 20, 2003    (JP)    ............... 2003-142228

(51) Int. Cl.
    *G01P 3/36*    (2006.01)
(52) U.S. Cl. .................... 356/28.5; 356/28
(58) Field of Classification Search .......... 356/28.5
    See application file for complete search history.

(56) References Cited

U.S. PATENT DOCUMENTS

| 6,591,192 B2 | 7/2003 | Okamura et al. | |
|---|---|---|---|
| 6,750,805 B1 * | 6/2004 | Cameron | ...... 342/90 |
| 2001/0037165 A1 * | 11/2001 | Shirai et al. | ...... 701/1 |
| 2002/0032515 A1 * | 3/2002 | Nakamura et al. | ...... 701/96 |

FOREIGN PATENT DOCUMENTS

| JP | 7-057182 A | 3/1995 |
|---|---|---|
| JP | 9-159759 A | 6/1997 |
| JP | 11-045395 A | 2/1999 |
| JP | 2001-001790 A | 1/2001 |
| JP | 2001-243598 A | 9/2001 |
| JP | 2002-031686 A | 1/2002 |
| JP | 2002-352399 A | 12/2002 |
| JP | 2002-358600 A | 12/2002 |

* cited by examiner

*Primary Examiner*—Thomas H. Tarcza
*Assistant Examiner*—Luke D. Ratcliffe
(74) *Attorney, Agent, or Firm*—Foley & Lardner LLP (57) ABSTRACT

A vehicle external recognition system is provided with: a relative position detecting section detecting an object ahead of a vehicle as a detected object to detect a relative position relationship between the detected object and the vehicle, a relative velocity calculating section calculating a relative velocity between the detected object and the vehicle based on the relative position relationship detected by the relative position detecting section by using an initial value that is preset, a vehicle velocity detecting section detecting a velocity of the vehicle, and a motion attribute discriminating section discriminating a motion attribute, indicative of a motion state of the detected object, based on the relative velocity calculated by the relative velocity calculating section and the velocity detected by the vehicle velocity detecting section.

11 Claims, 5 Drawing Sheets

VEHICLE EXTERNAL RECOGNITION SYSTEM AND RELATED METHOD

BACKGROUND OF THE INVENTION

The present invention relates to a vehicle external recognition system and a related method and, more particularly, to a vehicle external recognition system and its related method wherein a relative position between a forward object present ahead of an own vehicle and the own vehicle is detected and, based on this relative position, a relative velocity between the forward object and the own vehicle is calculated, thereby detecting a motion state of the forward object.

Japanese Patent Application Laid-Open Publication No. 9-159759 discloses a device arranged to detect a forward object present ahead of an own vehicle for thereby detecting a motion state of the forward object. In particular, this device is configured such that a relative velocity between the captured forward object and the own vehicle is calculated and, on this occasion, if a calculated relative velocity lies within a given range determined by the speed of the own vehicle and such a resulting status can be continuously obtained from a past history, then the captured forward object is determined as a forward preceding vehicle and on the other hand, the rest is determined as a stationary object.

SUMMARY OF THE INVENTION

However, upon studies conducted by the present inventors, since such a structure is arranged to calculate the relative velocity using a least-square method based on a plurality of distance signals, it takes time before accurate discrimination is made to find a status whether the forward object is a stationary object or a moving object. Therefore, it is considered that a control device, which uses such a calculated relative velocity to perform control, has a tendency wherein even if the forward object is detected, it is hard to take appropriate measures before the relative velocity is calculated.

The present invention has been completed upon such studies being undertaken by the present inventors and has an object to provide a vehicle external recognition system and its related method which makes it possible to quickly discriminate whether a detected forward object is a stationary object or a moving object.

To achieve this object, in one aspect of the present invention, a vehicle external recognition system comprises: a relative position detecting section detecting an object ahead of a vehicle as a detected object to detect a relative position relationship between the detected object and the vehicle; a relative velocity calculating section calculating a relative velocity between the detected object and the vehicle based on the relative position relationship detected by the relative position detecting section by using an initial value that is preset; a vehicle velocity detecting section detecting a velocity of the vehicle; and a motion attribute discriminating section discriminating a motion attribute, indicative of a motion state of the detected object, based on the relative velocity calculated by the relative velocity calculating section and the velocity detected by the vehicle velocity detecting section.

In other words, in another aspect of the present invention, a vehicle external recognition system comprises: relative position detecting means for detecting an object ahead of a vehicle as a detected object to detect a relative position relationship between the detected object and the vehicle; relative velocity calculating means for calculating a relative velocity between the detected object and the vehicle based on the relative position relationship detected by the relative position detecting means by using an initial value that is preset; vehicle velocity detecting means for detecting a velocity of the vehicle; and motion attribute discriminating means for discriminating a motion attribute, indicative of a motion state of the detected object, based on the relative velocity calculated by the relative velocity calculating means and the velocity detected by the vehicle velocity detecting means.

On the other hand, in another aspect of the present invention, a method of recognizing vehicle external, comprises: detecting an object ahead of a vehicle as a detected object to detect a relative position relationship between the detected object and the vehicle; calculating a relative velocity between the detected object and the vehicle based on the relative position relationship by using an initial value that is preset; detecting a velocity of the vehicle; and discriminating a motion attribute indicative of a motion state of the detected object based on the relative velocity between the detected object and the vehicle and the velocity of the vehicle.

Other and further features, advantages, and benefits of the present invention will become more apparent from the following description taken in conjunction with the following drawings.

DETAILED DESCRIPTION OF THE PREFERRED EMBODIMENTS

Hereinafter, a vehicle external recognition system and its related method of an embodiment according to the present invention is described in detail with reference to the accompanying drawings FIGS. 1 to 8.

Figure 1:
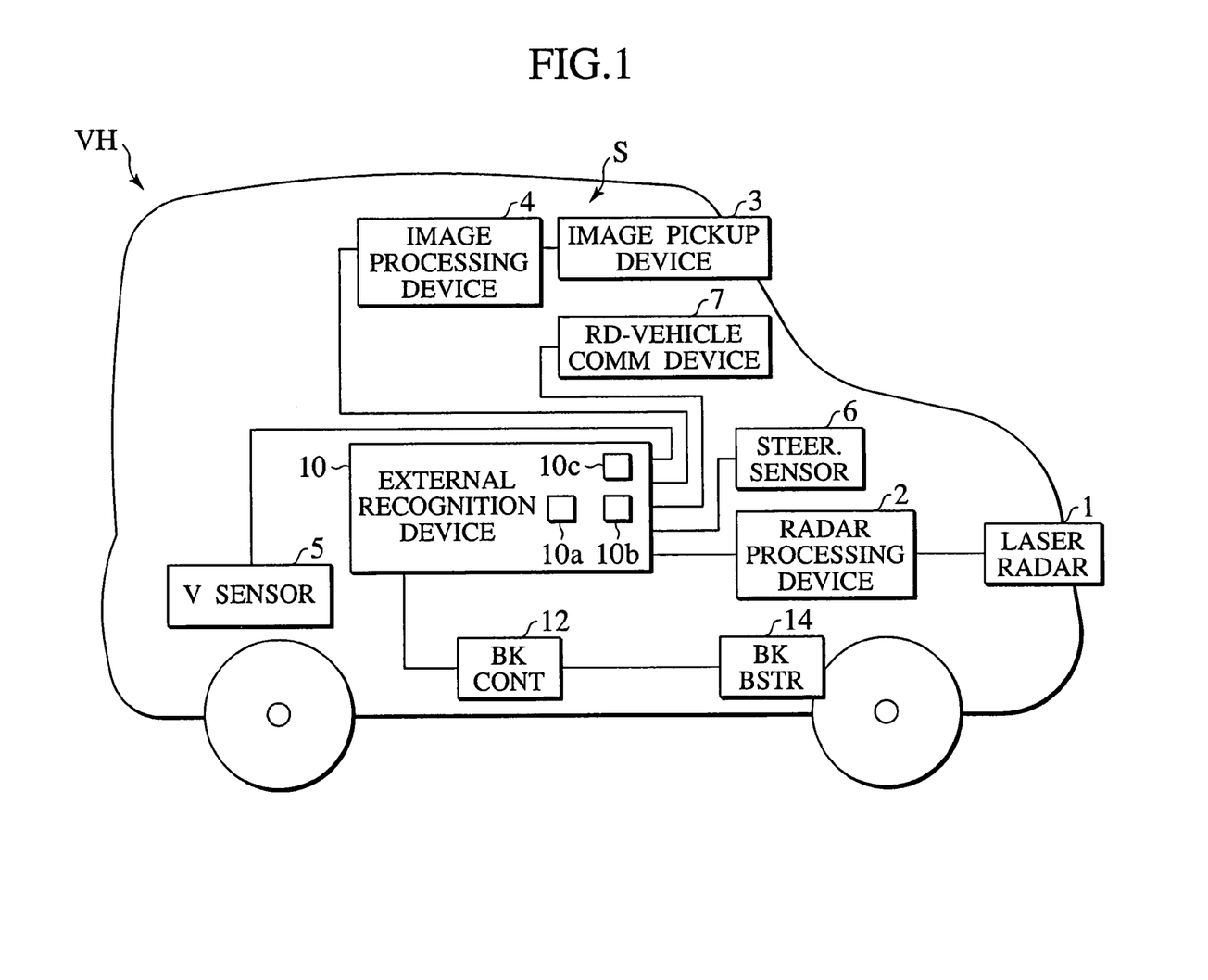
FIG. 1 is a schematic structural view illustrating a vehicle brake control device applied with a vehicle external recognition system of an embodiment according to the present invention.

FIG. 1 is a schematic structural view of a vehicle brake control system applied with a vehicle external recognition system S in a vehicle VH of the presently filed embodiment.

In FIG. 1, a laser radar 1 typically includes a scanning type laser radar disposed at front end of the vehicle VH, that is, an own vehicle VH, and serves to detect an object ahead of the own vehicle. Here, the laser radar 1 is not based on detection theory that enables a relative velocity to be directly detected through a Doppler effect provided by a device such as a millimeter wave radar.

And, a scanned result of the laser radar 1 is inputted to a radar processing device 2 that calculates a two-dimensional coordinating value related to the own vehicle as the origin with respect to one or more obstacles detected by the laser radar 1, that is, a coordinating value on two axes in a direction along a vehicle-to-vehicle distance and in a direction along a vehicle widthwise direction, while calculating a width (size) of the obstacle candidate. Then, these calculated results are inputted to an external recognition device 10.

Further, mounted to an appropriate position, such as the front end, of the vehicle is an image pickup device 3 that typically includes a progressive-scan type 3 CCD camera for picking up an image of an area ahead of the own vehicle and rapidly obtaining a forward state ahead of the own vehicle.

And, a pickup image result of the image pickup device 3 is inputted to the image processing device 4, which stores image data close proximity to a positional coordinate of the obstacle candidate captured by the radar processing device 2, and executes detection through image processing of the radar-detected object, which is lost as the obstacle candidate due to pitching or rocking of the own vehicle. Then, a detected result of the image processing device 4 is inputted to the external recognition device 10.

Further, mounted on the vehicle as sensors for detecting a running state of the own vehicle are a vehicle speed sensor 5 that detects rotational speeds of left and right rear wheels as non-driven wheels, thereby detecting velocity of the own vehicle, and a steering angle sensor 6 that detects a steering angle of front wheels, with resulting detected values being inputted to the external recognition device 10.

Furthermore, mounted to the vehicle is a road-vehicle communication device 7 that communicates information with so-called infrastructure on a side of a road. The road-vehicle communication device 7 acquires a running state in near future, that is, road status information ahead of the own vehicle representing whether a stopped vehicle, such as a troubled vehicle, is present ahead of the own vehicle on a road lane along which the own vehicle is running.

The external recognition device 10 calculates the relative velocity between the object captured by the radar processing device 2 and the own vehicle and, depending upon resulting relative velocity and information inputted from various devices and sensors, determines whether the object captured by the radar processing device 2 is an obstacle for the own vehicle. In particular, the external recognition device 10 includes a relative velocity calculating section 10a, a motion attribute discriminating section 10b and a relative velocity determining section 10c.

Here, when discrimination of the external recognition device 10 is made that the detected forward object is an obstacle object for the own vehicle and there is a probability of collision between the own vehicle and the obstacle object, control command is outputted from the external recognition device 10 to an automatic brake control device 12 at needs. More particularly, the automatic brake control device 12 is so arranged as to actuate a negative pressure brake booster 14 such that a distance between the detected forward object and the own vehicle is divided with a relative velocity Vr of the forward object calculated by the external recognition device 10 to calculate a reaching time before the own vehicle reaches to a position in which the forward object is present while calculating a braking start timing that is set in dependence on a vehicle speed (velocity) Vsp of the own vehicle, that is, a requisite time for deceleration to adequately occur when running at a current vehicle speed, whereupon when the reaching time becomes less than such a braking start timing, a braking force is applied to respective wheels to avoid collision with the obstacle object.

Also, the radar processing device 2, the image processing device 4, the external recognition device 10 and the automatic brake control device 12 include processing units, such as microcomputers, and related peripheral units as well as driver circuits for driving respective actuators, respectively, any of which is not shown, and are enabled to transmit information to and receive information from each other through a communication network.

Figure 2:
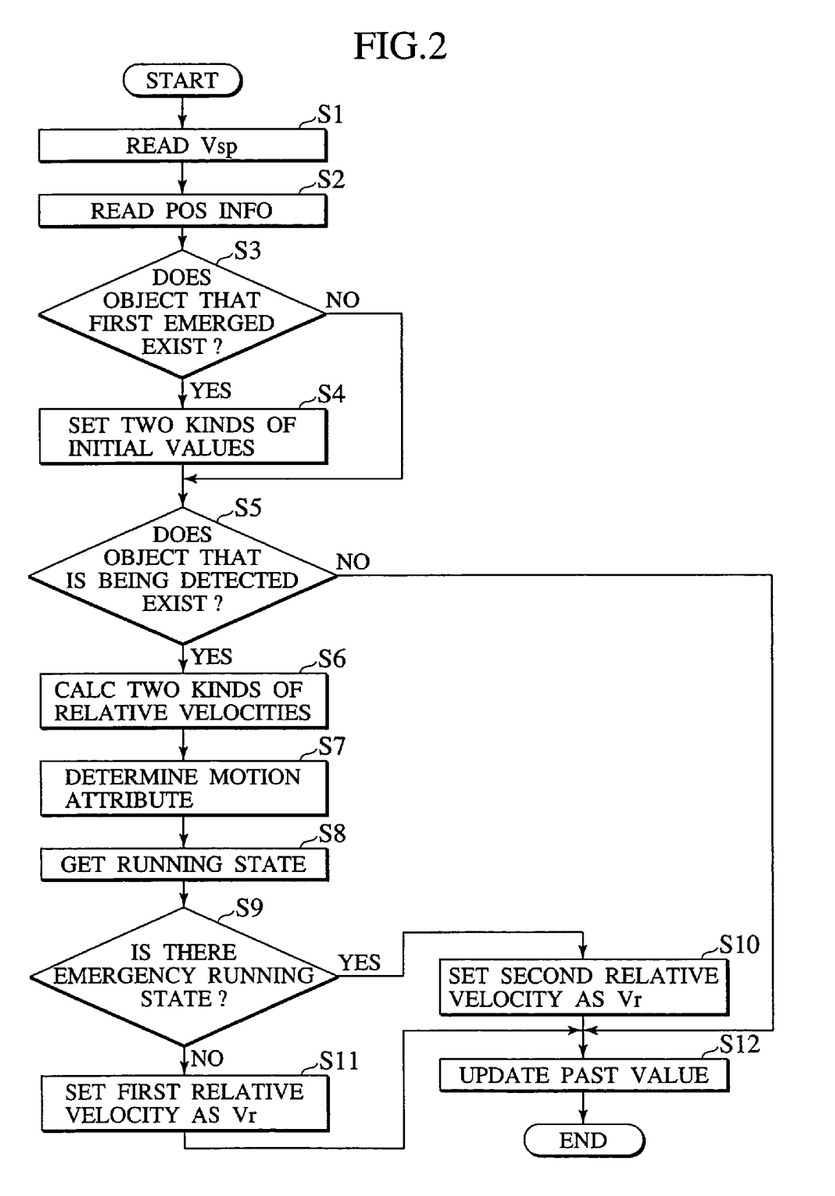
FIG. 2 is a flowchart illustrating an operational sequence of relative velocity calculating processing to be executed in the vehicle external system shown in FIG. 1 of the presently filed embodiment.

FIG. 2 is a flowchart illustrating a sequence of operations to be executed in relative velocity calculating processing, for calculating the relative velocity with respect to the forward object, to be executed by the external recognition device 10. Also, such processing for calculating the relative velocity is executed for each sampling time of approximately 100 [ms].

As shown in FIG. 2, first in step S1, processing for calculating the relative velocity is executed to read in the own vehicle speed (running speed) Vsp [m/s] of the own vehicle from the vehicle speed sensor 5.

Then, processing proceeds to succeeding step S2 where the radar processing device 2 reads in a relative position of the forward object and a width W thereof as radar-detected information correlated with the forward object resulting from the laser radar 1. Also, such a relative position is represented by a x-y rectangular coordinate system with a coordinate Px indicating a vehicle widthwise direction on a direction x and a coordinate Py indicating an own vehicle running direction on a direction y.

Next, processing proceeds to step S3 where discrimination is made based on radar-detected information read in step S2 as to whether, at this sampling, there exists the forward object that emerged for the first time. For example, this discrimination is executed based on radar-detected information that is preliminarily stored at a preceding sampling, whereupon if discrimination is made that the forward object that first emerged at current time exists, processing is routed to step S4 and if not, processing is routed to step S5.

In succeeding step S4, two kinds of relative velocities with different initial values are set with respect to the forward object that appears for the first time. In particular, two kinds of initial states, involving a first relative velocity with a first initial value expressed in a formula (2) associated with a formula (1) and a second relative velocity with a second initial value expressed in a formula (4) associated with a formula (3) are set as expressed below.

$$Py1(0)=Py,\ Py1(1)=Py,\ Py1(2)=Py \qquad (1)$$

$$Vry1(0)=0,\ Vry1(1)=0,\ Vry1(2)=0 \qquad (2)$$

$$Py2(0)=Py,\ Py2(1)=Py+Ts\cdot Vsp,\ Py2(2)=Py+2\cdot Ts\cdot Vsp \qquad (3)$$

$$Vry2(0)=Vsp,\ Vry2(1)=Vsp,\ Vry2(2)=Vsp \qquad (4)$$

Here, in the above formulae (1) to (4), (0) means the value at the current sampling timing; (1) means the value in the past by one sampling and, similarly, (n) means the value in the past by n-sampling (n=0, 1, 2, . . . :by when n=0 is meant the current sampling timing). That is, by Py1(n) is meant the first coordinate on the direction y that is the direction along which the own vehicle was running in the past by n-sampling; by the Vry1(n) is meant the first relative velocity in the past by n-sampling associated with these past values, respectively; by Py2(n) is meant the second coordinate on the direction y that is the direction along which the own vehicle was running in the past by n-sampling; and by Vry2(n) is meant the second relative velocity in the past by n-sampling. Also, Ts represents a sampling period [s].

More particularly, as set forth above, by the first relative velocity expressed by the formula (2) related to the formula (1) is meant the value (initial value) derived when the forward object, present immediately after detection, is supposed to be a running vehicle that is running in the same direction at the same speed as that of the own vehicle. On the other hand, by the second relative velocity expressed by the formula (4) related to the formula (3) described above is meant the value (initial value) derived when the forward object, immediately after detection, is supposed to be a stopped vehicle (stationary object).

Subsequently, processing is routed to step S5 where discrimination is made whether the object that is captured by the laser radar 1 exists. And, if the captured object exists, processing is routed to step S6.

In this step S6, the relative velocity of the radar-detected object is calculated based on formulae (5) and (6) described below.

$$Vry1(0)=a \cdot Vry1(1)-b \cdot Vry1(2)+c \cdot Py1(0)-c \cdot Py1(2) \quad (5)$$

$$Vry2(0)=a \cdot Vry2(1)-b \cdot Vry2(2)+c \cdot Py2(0)-c \cdot Py2(2) \quad (6)$$

Here, in the above formulae (5) and (6) set forth above, coefficients a, b, c are positive numbers that correspond to coefficients to exhibit a desired pseudo differential characteristic and such a computation is digitized at a sampling period of 100 [ms]. Specifically, in the formulae (5) and (6), such a computation is executed using the same coefficients a, b, c, and results in calculation to obtain the two kinds of relative velocities with an identical dynamic behavior while using different initial values.

Thus, if the first and second relative velocities are calculated, then processing is routed to step S7, where the motion attribute of the detected object is determined based on the own vehicle speed Vsp, calculated in step S1, and the second relative velocity Vry2 calculated in step S6, that is, the relative velocity derived when the detected object is supposed to be the stopped vehicle.

More particularly, if an absolute value in a difference between the own vehicle speed Vsp and a current value Vry2(0) of the second relative velocity is equal to or less than a threshold value Th, discrimination is made that the detected object is a "stationary object". Moreover, if the second relative velocity Vry2(0) is greater than a sum of the own vehicle speed Vsp and the threshold value Th, then, discrimination is made that the forward object is an "oncoming vehicle". Further, if the second relative velocity Vry2(0) is less than a value derived by subtracting the threshold value Th from the own vehicle speed Vsp, discrimination is made that the forward object is a "moving object that is running in the same direction as the own vehicle ". Incidentally, the threshold value Th is a positive value that is appropriately determined upon consideration of a detecting precision of the laser radar 1 or the like.

That is, the motion of the detected object can be classified into three categories of motion attributes, that is, an object that is moving in the same direction as the own vehicle, a stationary object, and an oncoming vehicle that is running in a direction opposite to the own vehicle.

Figure 3:
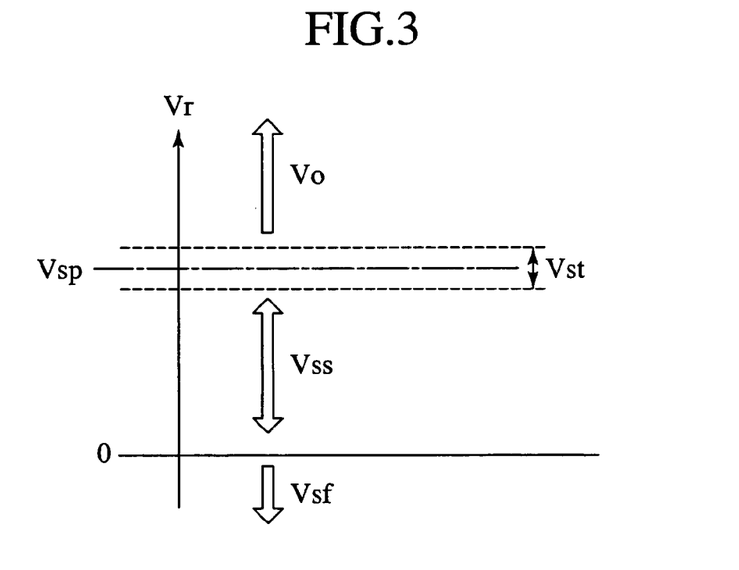
FIG. 3 is a view for illustrating a method of determining motion attribute of a detected object in the presently filed embodiment.

FIG. 3 is a view for illustrating a method of discriminating the motion attribute of the detected object.

As shown in FIG. 3, if the detected object is involved in a region Vst to be the stationary object, a steady-state value of a resulting relative velocity has a magnitude that is equivalent to the own vehicle speed Vsp. Further, if the detected object is involved in a region Vo to be the oncoming vehicle, a steady-state value of a resulting relative velocity has a magnitude greater than the own vehicle speed Vsp. Furthermore, if the detected object is an object that is moving in the same direction as that in which the own vehicle is running, a steady-state value of a resulting relative velocity has a value less than the own vehicle speed Vsp such that if the detected object is involved in a region Vss, the steady-state value of the resulting relative velocity has a value less than the own vehicle speed Vsp and if the detected object is involved in a region Vsf, the steady-state value of the resulting relative velocity has a value faster than the own vehicle speed Vsp.

Incidentally, here, a direction in which the own vehicle travels is regarded to be positive, and the relative velocity is calculated by subtracting the speed of the detected object from the own vehicle speed Vsp.

Further, here, the automatic brake control device 12 is designed to perform brake control based on the relative velocity Vr, and in an event that the detected object is an object which is running in the same direction as that of the own vehicle, if the detected object is an object that is running at a speed lower than the own vehicle speed, a probability occurs for the own vehicle to collide with the forward object whereas if the detected object is an object that is moving at a speed higher than the own vehicle speed, then a distance between the own vehicle and the forward object increases with no occurrence of a probability for the two objects to collide each other. Here, in view of characteristics in processing, such detected objects that are running in the same direction as that in which the own vehicle is running are treated as objects in a bundle.

In such a manner, if the motion attribute of the detected object is determined, processing is routed to step S8 where the road-vehicle communicating device 7 gets a running state ahead of the own vehicle depending upon infra-information acquired from infrastructure. That is, determination is made upon acquiring information as to whether there exists the obstacle object, i.e., the stopped vehicle such as a troubled vehicle, to be an obstacle for the own vehicle.

Next, processing is routed to step S9 where discrimination is made as to whether the running state, ahead of the own vehicle, got and discriminated in step S8 falls in an emergency running state that needs to take a countermeasure. When in discrimination, if notification is made that an obstacle object, such as the stopped vehicle, is present ahead of the own vehicle on a travel lane on which the own vehicle is currently running, discrimination is made that there exists the emergency running state whereas if notification is made that no obstacle object is present on the travel lane on which the own vehicle is currently running, discrimination is made that there exists no emergency running state.

And, if discrimination is made that there exists the emergency running state, that is, when notification is made that there exists the obstacle object, such as the stopped vehicle, ahead of the own vehicle on the same travel lane as that of the own vehicle, since a provability exists in which newly detected object is the stopped vehicle, processing is routed to step S10 where the second relative velocity Vry2 (0), calculated on the supposition that the detected forward object is the stationary object, is determined as the relative velocity Vr of the forward object for use in brake control operation of the automatic brake control device 12, and using such a value compels the automatic brake control device 12 to control the negative pressure brake booster 14 for actuating the brake. On the contrary, if discrimination is made that there exists no emergency running state, that is, when notification is made that there exists no obstacle object, such as the stopped vehicle, present ahead of the own vehicle on the same travel lane as that of the own vehicle, since a high provability exists in which the detected object is not the stopped vehicle, processing is routed to step S11 where first relative velocity Vry1 (0), calculated on the supposition that the detected forward object is the moving object that is running in the same direction at the speed as those of the own vehicle, is determined as the relative velocity Vr of the forward object for use in brake control operation.

In such a manner, in step S10 or step S11, if the relative velocity Vr of the forward object is determined, processing is routed to step S12 wherein various information, such as the motion attribute of the detected object, the position and width information of the detected object, are delivered to the automatic brake control device 12, while updating the position of the detected object, whose attribute is detected, and the past values of the first and second relative velocities whereupon current processing is terminated.

Further in step S5, even if discrimination is made that there exists no object being detected, processing is directly routed to step S12 and after executing processing in step S12, current processing is terminated.

Figure 4:
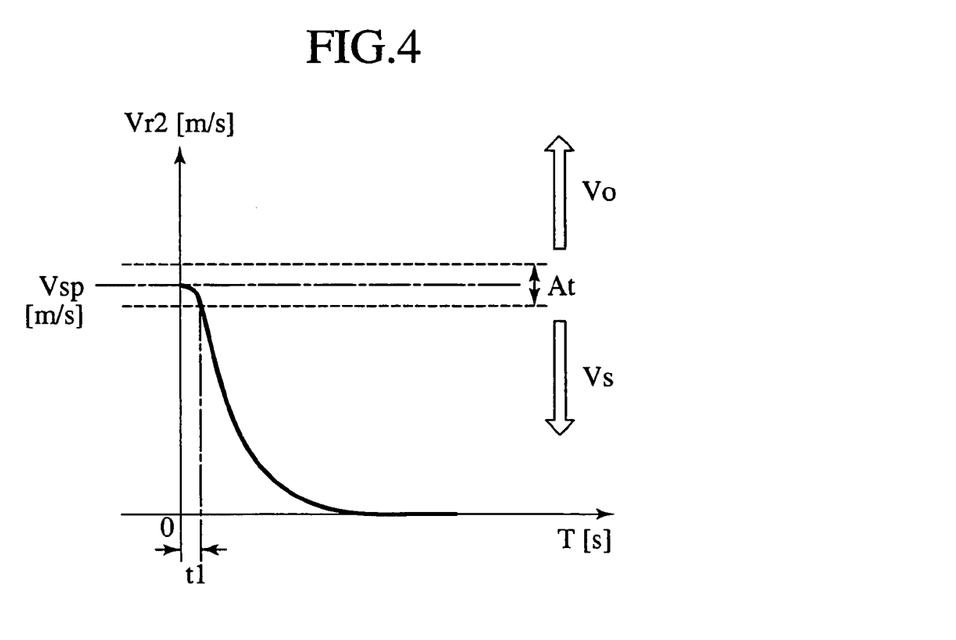
FIG. 4 is a view representing a varying state in a second relative velocity obtained when the detected object is supposed to be a stationary object in the presently filed embodiment.

Next, referring also to FIG. 4 and subsequent drawings, processing of the external recognition device 10 mainly forming the presently filed embodiment is described more in detail.

Figure 5:
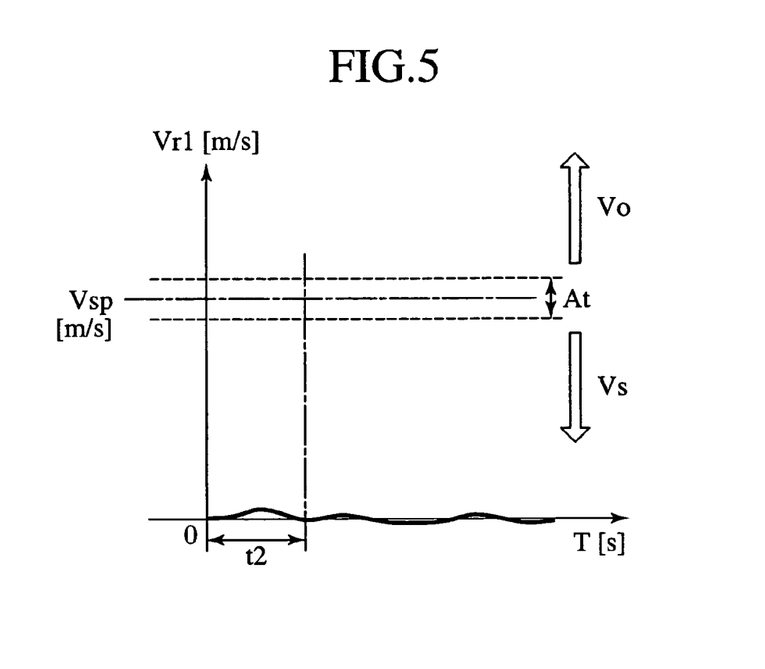
FIG. 5 is a view representing a varying state in a first relative velocity obtained when the detected object is supposed to be a moving object in the presently filed embodiment.
Figure 6:
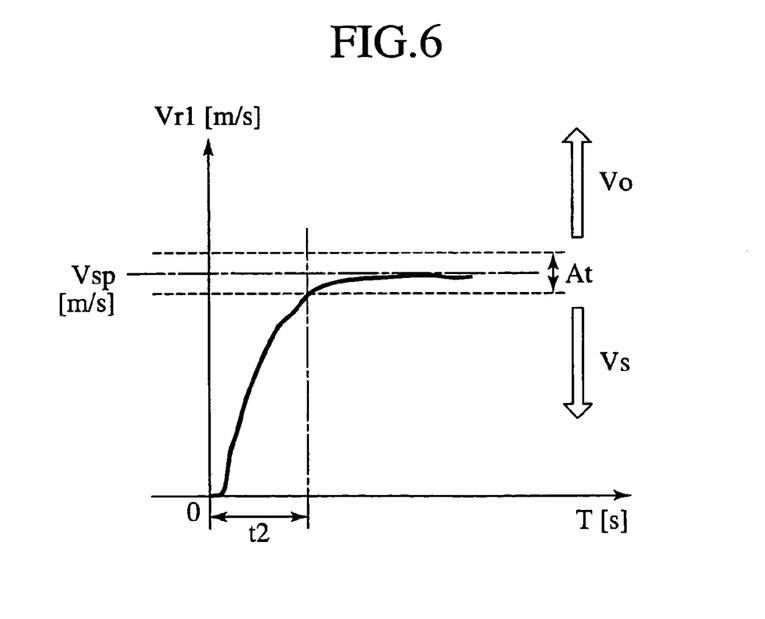
FIG. 6 is a view representing a varying state in the first relative velocity obtained when the detected object is supposed to be a moving object in the presently filed embodiment.
Figure 7:
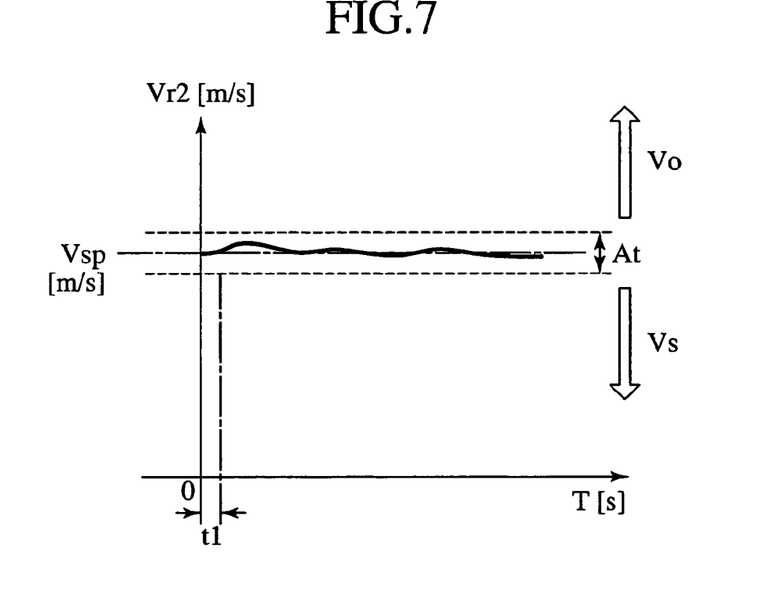
FIG. 7 is a view representing a varying state in the second relative velocity calculated when the detected object is supposed to be a stationary object in the presently filed embodiment.
Figure 8:
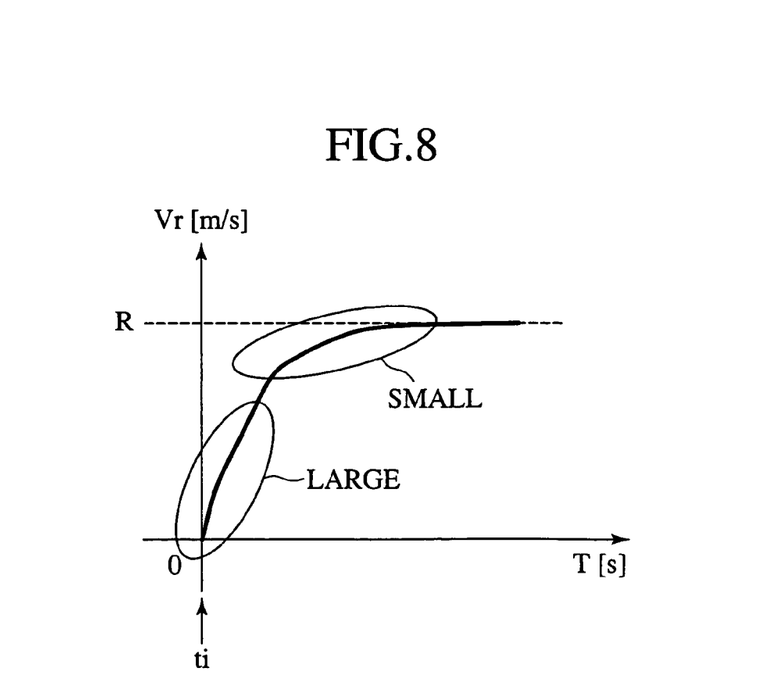
FIG. 8 is a view for illustrating a converging characteristic of the relative velocity in the presently filed embodiment.

FIG. 4 is a view representing variation in the second relative velocity Vr2 in terms of time T in case where the detected object is supposed to be the stationary object; FIG. 5 is a view representing variation in the first relative velocity Vr1 in terms of time T in case where the detected object is supposed to be the moving object that is running in the same direction as that of the own vehicle; FIG. 6 is a view representing variation in the first relative velocity Vr1 in terms of time T in case where the detected object is supposed to be the moving object that is running in the same direction as that of the own vehicle; FIG. 7 is a view representing variation in the second relative velocity Vr2 in terms of time T in case where the detected object is supposed to be the stationary object; and FIG. 8 is a view for illustrating a converging characteristic of the relative velocity Vr in terms of time T.

Now, suppose that the laser radar 1 detects an object under a circumstance where no object is detected ahead of the own vehicle, due to the presence of the object being first detected, processing proceeds through steps S1 and step S2 and is routed from step S3 to step S4 where in accordance with the above formulae (1) to (4), the first relative velocity Vr1, calculated on the supposition that the detected object is the object that is moving in the same direction as that of the own vehicle at an equal speed, and the second relative velocity Vr2, calculated on the supposition that the detected object is the stationary object, are set to have respective initial values.

And, when this takes place, since the object is first detected, there exists no object being detected, that is, processing is routed from step S5 directly to step S12 where current values of the first and second relative velocities are used to update the values in the past by one sampling period whereupon current processing is terminated.

Further, at subsequent sampling timing, processing is routed through step S1 to step S2 where processing is executed to read in a positional coordinate of the object detected by the laser radar 1. At this instant, if it is supposed that there exists no object which has first emerged, processing is routed from step S3 to step S5 where due to the presence of the object being first detected, discrimination is made that there exists the object being detected whereupon processing is routed from step S5 to step S6 where the first and second relative velocities are calculated in accordance with the above formulae (1) to (4).

Then, processing is routed to step S7 where the motion attribute is determined based on the second relative velocity Vr2 resulting on the supposition that the detected object is the stationary object.

Here, if the relative velocity is calculated on a supposition that under a circumstance where the detected object is, in fact, a preceding vehicle that is running in the same direction on the same travel lane as those of the own vehicle, since the detected object is actually the preceding vehicle that is running on the same lane as that the own vehicle, the second relative velocity Vry2 (0) progressively decreases from the own vehicle speed Vsp, as shown in FIG. 4, and converges to zero at last if the detected object is running at the same speed as that of the own vehicle. Also, if the detected object is running at a speed higher than that of the own vehicle, the second relative velocity falls in a negative value.

And, immediately after detecting the object, since the second relative velocity Vr2 falls in a value equal to that of the own vehicle speed, the motion attribute, immediately after detection, of such a moving object is discriminated to be the stopped vehicle. Incidentally, in the drawing figure, Vo represents the region of the second relative velocity Vr2 to be obtained when the detected object is running on an oncoming lane, and Vs represents the region of the second relative velocity Vr2 to be obtained when the detected object is running in the same direction as that of the own vehicle. Further, up to time t1, since the second relative velocity Vr2 remains in an attribute identification area At, the detected object is judged to be the stopped vehicle and at timing after an elapse of time t1, the second relative velocity Vr2 departs from the attribute identification area At, discrimination can be made that the detected object is running in the same direction as that of the own vehicle.

Next, if discrimination is made from infra-information that there exists no emergency running state, that is, when no stopped vehicle is present ahead of the own vehicle, processing is routed from step S9 to step S11 where the first relative velocity Vr1, i.e., the first relative velocity Vr1 resulting when the detected object is supposed to be the object that is running in the same direction at the same speed as those of the own vehicle, are set as the relative velocity Vr of the detected object whereupon the automatic brake control device 12 executes brake control operation based on such a relative velocity, i.e., the first relative velocity Vr1.

And, also, at subsequent sampling timing, processing is similarly executed and if a difference value between the own vehicle speed Vsp and the second relative velocity Vr2 exceeds the threshold value Th, discrimination is made that the detected object is the object that is running in the same direction whereupon if no emergency running state consecutively exists, processing is routed from step S9 to step S11 where the first relative velocity Vr1 is determined to be the relative velocity Vr of the forward object.

Here, response of the first relative velocity Vr1, resulting when the forward object is supposed to be the object that is running in the same direction as that of the own vehicle at the same speed as that of the own vehicle, can be represented as shown in FIG. 5. Incidentally, the attribute identification area At in the vicinity of the own vehicle Vsp and time t2 are plotted in the drawing figure for the sake of reference.

As set forth above, the automatic brake control device 12 executes brake control operation based on the first relative velocity Vr1 calculated on supposition that the forward object is the object that is moving in the same direction as that of the own vehicle. When this takes place, since the forward moving object is actually the object that is moving in the same direction as that of the own vehicle and the first relative velocity Vr1 is calculated to have a value that is close proximity to zero as shown in FIG. 5, discrimination can be quickly made that the moving object is the object that is moving in the same direction as that of the own vehicle. And, the automatic brake control device 12 executes brake control operation based on such a relative velocity. That is, the first relative velocity Vr1 converges to a true relative velocity more quickly than that attained when the detected object is supposed to be the stationary object, as shown in FIG. 4, and depending upon such a value that exists in a range close proximity to the true relative velocity, brake control operation can be more accurately executed.

In addition, when performing brake control operation depending upon the second relative velocity Vr2, the relative velocity results in gradual reduction from the own vehicle speed value. Thus, in an event that the relative velocity does not converge to the true value, although a probability occurs wherein discrimination is made that there is a need for generating a braking force based on a value of the own vehicle speed, in fact, the detected object is the object that is running at the speed equal to that of the own vehicle and, so, this leads to the generation of unwanted braking force. However, during a period wherein the relative velocity does not converge to the true value and an error is involved in the relative velocity, brake control operation is executed based on the first relative velocity Vr1 whose initial value is set to zero and subsequently remains in a small value and processing is executed to control the braking force in a so-called lowered gain, resulting in a capability of avoiding a tendency of generating an undesired braking force caused by the error occurring in the relative velocity.

On the contrary, if discrimination is made based on the running state of infra-information that there exists an emergency running state, that is, when the stopped vehicle is present ahead of the own vehicle, processing is routed from step S9 to step S10 where brake control operation of the automatic brake control device 12 is executed based on the second relative velocity Vr2, in place of the first relative velocity Vr1, that is, the second relative velocity Vr2 calculated when the detected object is supposed to be the stopped vehicle.

When this takes place, as shown in FIGS. 4 and 5, the second relative velocity Vr2 exists in a higher level than the true relative velocity as compared to the first relative velocity Vr1, that is, brake control operation is executed with a tendency to cause the braking force to more easily occur. Accordingly, even under a circumstance where errors relatively occur in the relative velocity immediately after detecting the object, if the presence of an emergency running state is predicted from the forward running state, brake control operation is executed based on the second relative velocity Vr2 calculated on the supposition that the detected object is the stopped vehicle with a tendency to more easily generate the braking force, making it possible to accurately generate the braking force in response to a degree of emergency that would occur ahead of the own vehicle.

Besides, in an event that the detected object detected by the laser radar 1 is the stationary object, the first relative velocity Vr1, calculated when the detected object is supposed to be the object that is running in the same direction as the own vehicle at an equal speed, increases from zero as shown in FIG. 6 and, at time t2, merges into the attribute identification area At to enable discrimination that the detected object is the stationary object, whereupon the first relative velocity Vr1 converges to the value equivalent to the own vehicle speed Vsp. On the contrary, the second relative velocity Vr2, calculated when the detected object is supposed to be the stationary object, immediately merges into the attribute identification area At, as shown in FIG. 7, to enable judgment that the detected object is the stationary object whereupon the second relative velocity Vr2 converges to the value equivalent to the own vehicle speed Vsp. Incidentally, in the drawing figure, time t1 shown in FIG. 4 is plotted for reference.

Consequently, in an event that the detected object is the stationary object, if the motion attribute is discriminated based on the second relative velocity Vr2, processing results in judgment immediately after detecting the object that the detected object is the stationary object. When this takes place, if no emergency running state exists, processing is routed from step S9 to step S11 where the automatic brake control device 12 is applied with the value of the first relative velocity Vr1 based on which brake control operation is carried out.

Here, although the detected object is actually the stationary object, the first relative velocity Vr1 results from supposition that the detected object is running at the same speed as that of the own vehicle speed and, so, the first relative velocity Vr1 gradually increases from zero as shown in FIG. 6.

Accordingly, the first relative velocity Vr1 is set to a lower value than the actual relative velocity, and if brake control operation is executed in the automatic brake control device 12 depending upon the first relative velocity Vr1, the braking force is generated such that a relatively low gain is provided.

In this case, the braking force results in the lowered gain under a circumstance wherein immediately after the object is detected and a relatively large number of errors are involved.

In addition, in an event that the emergency running state takes place, processing is routed from step S9 to step S10 where brake control operation is executed based on the second relative velocity Vr2 and, as shown in FIGS. 6 and 7, the second relative velocity Vr2 exists at a higher level than the first relative velocity Vr1 whereby when there exists an emergency, carrying out brake control operation based on the relative velocity existing at the relatively high level makes it possible to generate the braking force in a way to meet a state of emergency.

Thus, the presently filed embodiment contemplates the provision of a structure wherein the relative velocity Vr of the detected object for use in the automatic brake control device 12 includes the initial value, associated with the detected object, which is set firstly to zero, that is, control is executed firstly based on the first relative velocity Vr1 calculated on the supposition that the detected object is the moving object that is running at a speed equal to that of the own vehicle whereupon brake control is carried out based on the first relative velocity Vr1 calculated to have a lower value than that of the second relative velocity Vr2 calculated on the supposition that the detected object is the stationary object. Therefore, the braking force can be generated with a lowered gain under a circumstance where determination of the attribute, as to whether the object present immediately after it is detected is the stationary object or the moving object, is made at a low precision, resulting in reduction in discomfort occurring a driver as a result of the generation of unwanted braking force whereby it becomes possible to build up a running control system with no probability in rapid generation of an increased braking force in response to the detected object.

Further, as shown in FIGS. 4 to 7, the time required for determining the attribute of the detected object in terms of the relative velocity includes the duration t2 in case of the first relative velocity Vr1 calculated on the supposition that the detected object is the stationary object whereas the time, associated with the second relative velocity Vr2 calculated on the supposition that the detected object is the moving object that is running in the same direction as that of the own vehicle at the same speed as that of the own vehicle, includes the duration t1 that is set to be shorter than the duration t2. To this end, there is a contribution of a smoothing effect by which when calculating the relative velocity, and thus computing results are avoided from oscillating.

Further, as shown in FIG. 8, transient response in the relative velocity Vr that is calculated at time ti immediately after detecting the object varies in a way to approach closer to a true value R, as time T goes on, such that the closer to the true value R, the less will be the degree of approaching.

Here, as previously mentioned, when the relative velocity Vr is equivalent to the value of the own vehicle speed Vsp, the detected object can be determined to be the stationary object and the rest can be determined to be the moving object. Thus, when calculating the relative velocity on the supposition that the detected object is the stationary object, as shown in FIG. 7, if the detected object is actually the stationary object, a true attribute can be quickly determined whereas if the detected object is the moving object, as shown in FIG. 4, the detected object is erroneously determined to be the stationary object until the relative velocity Vr2 departs from the attribute identification area At where the relative velocity Vr2 is regarded to be equal to the own vehicle speed Vsp, resulting in determining the true attribute at time instant after an elapse of time t1 at which the relative velocity Vr2 is deviated from the attribute identification area At.

On the other hand, when calculating the relative velocity on the supposition that the detected object is the moving object, as shown in FIG. 5, if the detected object is actually the moving object, the judgment result of the true attribute can be obtained at once. On the contrary, as shown in FIG. 6, if the detected object is the stationary object, the detected object is erroneously determined to be the moving object until the relative velocity Vr1 merges into the attribute identification area At, at time t2, in which the relative velocity Vr1 is regarded to be equivalent to the own vehicle speed Vsp, and the judgment result of the true attribute can be derived after an elapse of time t2 at which the first relative velocity Vr1 reaches the attribute identification area At.

Here, as shown in FIG. 8, a response characteristic per se of the relative velocity varies such that the closer to the timing at which the relative velocity begins to be calculated, the greater will be the momentum headed toward the true value and the greater will be the degree of inclination. Accordingly, especially as shown in FIG. 4, when calculating the relative velocity, utilizing a characteristic in that a value of the relative velocity varies toward the true value from the own vehicle speed results in a capability of determining, at an earlier stage, whether the relative velocity merges into the attribute identification area At for determining the stationary object.

Consequently, by determining the attribute, through processing in step S7, depending upon the second relative velocity Vr2 providing the characteristic as shown in FIG. 4 which enables to determine, at an earlier stage, whether the detected object is the stationary object, the attribute of the detected object can be accurately determined at the earlier stage. Accordingly, by taking measures suited for respective attributes depending upon a result of judgment of the attribute based on such a second relative velocity Vr2, appropriate measure can be taken for the detected object at the earlier stage.

Further, when this takes place, if notification is made in response to infra-information that the stopped vehicle is present on the same lane as that on which the own vehicle is currently running, brake control operation is carried out based on the second relative velocity Vr2 that is calculated on the supposition that the detected object is the stationary object and varies at a level higher than that of the first relative velocity Vr1, and hence, improved response can be provided in computing the relative velocity during a transition period immediately after the object is detected while a transient relative velocity can be derived at improved precision.

Further, when determining the motion attribute, since the motion attribute is determined based on the second relative velocity Vr2 resulting from the supposition that the detected object is the stationary object, that is, the motion attribute is determined based on the second relative velocity Vr2 that makes it possible to discriminate whether the detected object is the stationary object at an earlier stage than that attained in the first relative velocity Vr1 resulting from the supposition that the detected object is the stationary object whereby the time required for determining the motion attribute of the detected object can be shortened while eliminating fluctuations in the relative velocity, that is, without altering a cut-off frequency of pseudo differential calculation. In addition, the time required for determining the motion attribute of the detected object can be shortened even when the detected object is running on an ordinary road on which no infra-information is provided.

Further, the first relative velocity Vr1 resulting from the supposition that the detected object is the moving object that is running at the same speed as the own vehicle is set to be the relative velocity Vr of the detected object, and the automatic brake control device 12 is arranged to carry out brake control operation based on this first relative velocity Vr1, that is, the first relative velocity Vr1 that is set to a lower level than that of the second relative velocity Vr2. Accordingly, during brake control operation, the automatic brake control device 12 regards a current status to fall in a tendency, in that the relative velocity is low and there is a relatively less need for the braking force, and generates the braking force with a relatively lowered gain. Thus, it becomes possible for the own vehicle to be avoided from the occurrence of rapidly braked condition subsequent to detecting the forward object and, also, the own vehicle can be avoided from application of a strong braking force under a circumstance where a precision in judgment of the attribute of the object, subsequent to detecting the object, remains at a low level.

Furthermore, since the first and second relative velocities are calculated using identical dynamic characteristics but different in the initial values, the dynamic characteristic related to braking in brake control operation in the automatic brake control device 12 results in match with the dynamic characteristic in determining the attribute of the detected object. That is, the characteristic of the vehicle speed, which varies as a result of the braking force being applied through brake control operation, matches the dynamic characteristic, i.e., phase, of the relative velocity to be used in determining the attribute, enabling the motion attribute of the detected object to be determined at a high precision.

Incidentally, although the presently filed embodiment has been described with reference to brake control wherein processing is executed to calculate the relative velocity for use in the automatic brake control device 12, the present invention may have an application to a system provided that the system is configured to perform brake control based on the relative velocity. Particularly, the present invention may be preferably applied to systems, which need to quickly cope with the detected object, such as those in that control characteristics with increased braking forces are expected. Additionally, in general (regardless of the magnitude of the braking force), the present invention has an optimum application to a system adapted to perform brake control in dependence on the motion attribute of the detected object in a running system that dislikes to be subjected to intervening operation that is automatically controlled. Also, of course, the present invention is not limited to the control device arranged to perform brake control but may be applied to a control device provided that it is arranged to perform control using the relative velocity.

Further, while the presently filed embodiment has been described with reference to an application where the automatic brake control device 12 performs control based on the relative velocity, the presence of an ability of determining, based on the relative velocity, whether the detected object is the stationary object, whether the detected object is the moving object that is moving in the same direction as the own vehicle and whether the detected object is the oncoming moving object, the present invention can also be applied to a control device even if it is adapted to take different countermeasures in dependence on the attribute of the detected object.

Furthermore, while the presently filed embodiment has been described in connection with a case wherein by setting the second relative velocity Vr2, resulting from the supposition that the detected object is the moving object that is running at the same speed as that of the own vehicle, to be the relative velocity Vr to be used in the automatic brake control device 12, the automatic brake control device 12 performs brake control operation in a way to generate the braking force with the lowered gain immediately after detecting the object, the present invention is not limited to such application. When it is expected to have a high gain in a braking force characteristic immediately after detecting the object during brake control operation, the second relative velocity Vr2 in place of the first relative velocity Vr may be set to be the relative velocity Vr.

Additionally, while the presently filed embodiment has been described in connection with a case wherein one object is detected as the detected object, it is, of course, needless to say that the present invention may also be similarly applied to a case where multiple objects are detected, and such a case may be exploited by performing the same operations as those described above for each of the detected objects.

Also, while the presently filed embodiment has been described in connection with a case wherein infra-information is acquired from the road-vehicle communication device 7 and used to acquire the running state ahead of the own vehicle, no limitation is intended to such application. The present invention may be applied to forward road status acquiring systems, such as those utilizing vehicle-to-vehicle communication, provided that they have a capability of acquiring a road status ahead of the own vehicle.

Further, while the presently filed embodiment has been described in connection with a case wherein using infra-information enables operation to find whether the emergency running state exists, no limitation is intended to such application. The degree of approximation in which the own vehicle is coming closer to the detected object may be estimated based on a distance between the own vehicle and the detected object, the own vehicle speed and acceleration of the own vehicle, and using an estimated result may allow judgment to find whether the emergency state exists.

Moreover, while the presently filed embodiment has been described in connection with a case where using infra-information allows discrimination to be made to find which of the first and second relative velocities is to be used, no need arises to perform such discrimination necessarily based on infra-information, and depending upon the result of determining the attribute of the detected object through processing in step S7, discrimination may be made to find which of the first and second relative velocities is to be used.

Also, while the presently filed embodiment has been described in connection with a case where the relative velocities are calculated in respect of a case where the initial value is set to include the own vehicle speed as a result of the supposition that the detected object is the stationary object and of a case where the initial value is set to be zero as a result of the supposition that the detected object is running at the same speed as the own vehicle, the present invention is not limited to such cases, and an arbitrary value may be set to be the initial value. By setting the initial value of the relative velocity to a value that include an intermediate value between zero and the own vehicle speed and calculating the relative velocity based on such an initial value, it becomes possible to determine the attribute of the detected object at a timing in that the time required for discriminating the stopped vehicle to be the stationary object matches the time required for discriminating the detected object to be a preceding vehicle that is running in the same direction as that on which the own vehicle is running.

Also, while the presently filed embodiment has been described in connection with a case where the two kinds of relative velocities are calculated in respect of the initial value including the own vehicle speed on the supposition that the detected object is the stationary object and the initial value being set to zero on the supposition that the detected object is running at the same speed as the own vehicle, the present invention is not limited to such an application. An alternative arrangement may also be provided which is adapted to calculate an arbitrary number of relative velocities and, as set forth above, not only zero and the own vehicle speed but also an intermediate value between zero and the own vehicle speed may be employed as initial values for the relative velocities to allow calculation of three kinds of relative velocities. In addition, since altering the initial value of the relative velocity enables alteration of a control characteristic of a control device adapted to use such a resulting relative velocity, the initial values may be set to enable the relative velocity to provide a desired control characteristic.

Additionally, while the presently filed embodiment has been described in connection with a case where the relative velocities are calculated based on the above formulae (5) and (6), no limitation is intended to such application and the present invention may be applied to a computing method provided that a current relative velocity is calculated based on the initial value and the past value.

Incidentally, with the presently filed embodiment, the laser radar 1 and the laser processing device 2 correspond to the relative position detecting section; the vehicle speed sensor 5 corresponds the vehicle speed detecting section; processings in steps S1 to step S6 in FIG. 2 correspond to processings of the relative velocity calculating section 10a; processing in step S7 in FIG. 2 corresponds to processing of the motion attribute discriminating section 10b; processings in step S10 and step S11 in FIG. 2 correspond to processings of the relative velocity determining section 10c; the road-vehicle communication device 7 corresponds to the running state detecting section; and processing in step S8 corresponds to processing of the running state detecting section.

As set forth above, the vehicle external recognition system has a structure wherein the relative velocity calculating section calculates the plural relative velocity candidates based on the plural different initial values that are preliminarily set to allow the relative velocity candidate, relevant to the attribute determined by the motion attribute discriminating section, to be selected from among the multiple relative velocity candidates resulting from calculation in the relative velocity calculating section, and which includes the relative velocity determining section by which the resulting relative velocity candidate is determined as the relative velocity relevant to the detected object and the own vehicle. Thus, with such a structure, during the transition period in which the relative velocity resulting immediately after the object has been detected does not represent the true value, the relative velocity candidate with a value suited for the attribute determined by the motion attribute discriminating section can be set to be the relative velocity.

Further, due to a structure wherein the plurality of relative velocity candidates have identical dynamic characteristics, when performing brake control in the vehicle depending upon the relative velocity determined by the relative velocity determining section, the characteristic of the vehicle speed that varies in dependence on this brake control matches the characteristic of the relative velocity candidate for use in judgment in the motion attribute discriminating section, that is, they are identical in phase and, hence, the motion attribute can be determined at a higher precision.

Furthermore, the presence of a structure, wherein the initial value of the relative velocity candidate is chosen to include a value corresponding to that of a case where the detected object is supposed to be the preceding vehicle that is running at the same speed as that of the own vehicle and a value corresponding to that of a case where the detected object is supposed to be the stationary object, results in calculation of the relative velocity candidates that provide different response characteristics under the transient condition where the relative velocity transits to the true relative velocity immediately after the object has been detected. Therefore, by setting the relative velocity candidate, with a response characteristic coped with a result of judgment in the motion attribute discriminating section, to be the relevant relative velocity enables the relative velocity to be calculated at an improved precision during the transient condition.

Moreover, since the motion attribute discriminating section is structured to determine the motion attribute based on the relative velocity candidate calculated based on a value corresponding to a case where the detected object is supposed to be the stationary object, the motion attribute can be determined based on the relative velocity candidate that makes it possible to determine, at an earlier stage, whether the detected object is the stationary object, thereby enabling the motion attribute to be determined at the earlier stage.

Also, due to the provision of a structure wherein the relative velocity is used as a state variable of the running control section that performs running control of the vehicle and the relative velocity determining section is configured to select the relative velocity candidate, which renders the control characteristic of the running control section to have a desired characteristic, based on the motion attribute determined by the motion attribute discriminating section, the control characteristic of the running control section can be improved during the transient condition immediately after the object has been detected.

Additionally, a structure is provided wherein the running control section performs brake control operation based on the relative velocity; the relative velocity calculating section calculates the relative velocity candidates with respective initial values including the value representing the case in which the detected object is supposed to be the preceding vehicle that is running at the same speed as that of the own vehicle and the value representing the case in which the detected object is supposed to be the stationary object; the motion attribute discriminating section determines the motion attribute based on the relative velocity candidate including the initial value composed of the value representing the case in which the detected object is supposed to be the stationary object; and the relative velocity determining section determines the relative velocity candidate, including the initial value composed of the value corresponding to the case wherein the detected object is supposed to be the preceding vehicle that is running at the same speed as that of the own vehicle, to be the relative velocity. Thus, the motion attribute can be determined based on the relative velocity candidate, resulting from the supposition that the detected object is the stationary object, which is able to determine whether the detected object is the stationary object, at an earlier stage, thereby enabling the motion attribute to be determined at the earlier stage. Also, by compelling the running control section to control the braking force based on the relative velocity candidate, resulting from the supposition that the detected object is the moving object, which varies at a smaller value than that resulting from the supposition that the detected object is the stationary object, it becomes possible to avoid the own vehicle from a tendency in which rapid braking takes place under a transient status in the relative velocity resulting immediately after the object has been detected.

Also, a structure is provided which includes the running state detecting section that detects the presence of whether there exists a status that needs to rapidly take a countermeasure against the detected object and wherein when the running state detecting section discriminates that there exists the status that needs to rapidly take the countermeasure against the detected object, the relative velocity determining section determines the relative velocity candidate, including the initial value composed of the value representing the case that the detected object is supposed to be the stationary object, to be the relative velocity. Thus, under a circumstance where there exists the status that needs to rapidly take the countermeasure against the detected object, the braking force can be controlled based on the relative velocity candidate, resulted from the supposition that the detected object is the stationary object and varying at a higher value than that resulting from the supposition that the detected object is the moving object, resulting in a capability of generating the braking force suited for the current running state.

The entire content of a Patent Application No. TOKUGAN 2003-142228 with a filing date of May 20, 2003 in Japan is hereby incorporated by reference.

Although the invention has been described above by reference to a certain embodiment of the invention, the invention is not limited to the embodiment described above.

Modifications and variations of the embodiment described above will occur to those skilled in the art, in light of the teachings. The scope of the invention is defined with reference to the following claims.

What is claimed is:

1. A vehicle external recognition system comprising:
   a relative position detecting section detecting an object ahead of a vehicle as a detected object to detect a relative position relationship between the detected object and the vehicle;
   a relative velocity calculating section calculating a relative velocity between the detected object and the vehicle based on the relative position relationship detected by the relative position detecting section by using an initial value that is preset, wherein the relative velocity calculating section calculates a plurality of relative velocity candidates based on a plurality of different initial values that are preset;
   a vehicle velocity detecting section detecting a velocity of the vehicle;
   a motion attribute discriminating section discriminating a motion attribute, indicative of a motion state of the detected object, based on the relative velocity calculated by the relative velocity calculating section and the velocity detected by the vehicle velocity detecting section; and
   a relative velocity determining section selecting a relative velocity candidate, associated with the motion attribute discriminated by the motion attribute discriminating section, from among the plurality of relative velocity candidates calculated by the relative velocity calculating section, and determining the relative velocity candidate as a relative velocity between the detected object and the vehicle.

2. The vehicle external recognition system according to claim 1, wherein the relative velocity determined by the relative velocity determining section is used as a state variable of a running control section that controls a running state of the vehicle.

3. The vehicle external recognition system according to claim 2, wherein the relative velocity determining section determines the relative velocity candidate as the relative velocity so as to realize a control characteristic required to the running control section based upon the motion attribute discriminated by the motion attribute discriminating section.

4. The vehicle external recognition system according to claim 2, wherein the running control section controls a braking force of the vehicle based on the relative velocity determined by the relative velocity determining section.

5. The vehicle external recognition system according to claim 4, wherein the relative velocity calculating section calculates a relative velocity candidate by using an initial value, having a value corresponding to a case wherein the detected object is supposed to be a preceding vehicle running at the same velocity as the vehicle, and a relative velocity candidate by using an initial value having a value corresponding to a case wherein the detected object is supposed to be a stationary object, respectively, and the motion attribute discriminating section discriminates the motion attribute based on the relative velocity candidate which has the initial value having the value corresponding to the case wherein the detected object is supposed to be the stationary object.

6. The vehicle external recognition system according to claim 5, further comprising a running state detecting section detecting whether there exists a state that needs a measure to be rapidly taken with respect to the detected object.

7. The vehicle external recognition system according to claim 6, wherein when the running state detecting section discriminates that the state which needs the measure to be rapidly taken is absent, the relative velocity determining section determines the relative velocity candidate, as the relative velocity, having the initial value with the value corresponding to the case wherein the detected object is supposed to be the preceding vehicle running at the same velocity as the vehicle.

8. The vehicle external recognition system according to claim 6, wherein when the running state detecting section discriminates that the state which needs the measure to be rapidly taken is present, the relative velocity determining section determines the relative velocity candidate, as the relative velocity, having the initial value with the value corresponding to the case wherein the detected object is supposed to be the stationary object.

9. A vehicle external recognition system comprising:
   a relative position detecting section detecting an object ahead of a vehicle and a relative distance from the vehicle to the detected object;
   a relative velocity calculating section setting a preset initial value as a relative velocity between the vehicle and the detected object immediately after first detecting the detected object and calculating the relative velocity based on the preset initial value and the detected relative position thereafter;
   a vehicle velocity detecting section detecting a velocity of the vehicle; and
   a motion attribute discriminating section discriminating a motion state of the detected object based on the relative velocity and the velocity of the vehicle;
   wherein the preset initial value is equal to zero.

10. A method for vehicle external recognition comprising:
    detecting an object ahead of a vehicle and a relative distance from the vehicle to the detected object;
    setting a preset initial value as a relative velocity between the vehicle and the detected object immediately after first detecting the detected object;
    calculating the relative velocity based on the preset initial value and a detected relative position thereafter;
    detecting a velocity of the vehicle; and
    discriminating a motion state of the detected object based on the relative velocity and the velocity of the vehicle;
    wherein the preset initial value is equal to a value of a relative velocity between the vehicle and the detected object when the detected object is moving at the same velocity as the velocity of the vehicle.

11. A method for vehicle external recognition comprising:
    detecting an object ahead of a vehicle and a relative distance from the vehicle to the detected object;
    setting a preset initial value as a relative velocity between the vehicle and the detected object immediately after first detecting the detected object;
    calculating the relative velocity based on the preset initial value and a detected relative position thereafter;
    detecting a velocity of the vehicle; and
    discriminating a motion state of the detected object based on the relative velocity and the velocity of the vehicle;
    wherein the preset initial value is equal to a value of a relative velocity between the vehicle and the detected object when the detected object is stationary.

* * * * *